United States Patent
Diez-Garias et al.

(10) Patent No.: US 10,161,252 B2
(45) Date of Patent: Dec. 25, 2018

(54) BLADE FLOW DEFLECTOR

(71) Applicant: Rutgers, The State University of New Jersey, New Brunswick, NJ (US)

(72) Inventors: Francisco J. Diez-Garias, New Brunswick, NJ (US); Arturo Villegas Vaquero, New Brunswick, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 390 days.

(21) Appl. No.: 15/193,327

(22) Filed: Jun. 27, 2016

(65) Prior Publication Data
US 2016/0305250 A1 Oct. 20, 2016

Related U.S. Application Data

(63) Continuation-in-part of application No. 15/039,993, filed as application No. PCT/US2014/067643 on Nov. 26, 2014.
(Continued)

(51) Int. Cl.
*F01D 5/14* (2006.01)
*F03B 17/06* (2006.01)
*F03D 1/06* (2006.01)

(52) U.S. Cl.
CPC ............ *F01D 5/141* (2013.01); *F03B 17/061* (2013.01); *F03D 1/0633* (2013.01);
(Continued)

(58) Field of Classification Search
CPC ........ F01D 5/14; F03D 1/0641; F03D 1/0683; F03B 17/061; B64C 3/58; B64C 11/18;
(Continued)

(56) References Cited

U.S. PATENT DOCUMENTS

| 5,058,837 A | 10/1991 | Wheeler |
| 7,566,203 B2 * | 7/2009 | Moser ................... F03D 1/0633 416/235 |

(Continued)

FOREIGN PATENT DOCUMENTS

| GB | 2374331 A | 10/2002 |
| WO | 2008113350 A2 | 9/2008 |

*Primary Examiner* — Igor Kershteyn
(74) *Attorney, Agent, or Firm* — Fox Rothschild LLP

(57) ABSTRACT

A blade assembly including a blade which includes a lift generating section with a first profiled body defined between a pressure surface and a suction surface. The first profile body extends from a first leading edge to a first trailing edge with a first chord extending form the first leading edge to the first trailing edge and being perpendicular to the radial direction. A plurality of flow deflectors extend along either the pressure surface or the suction surface within the lift generating section of the blade. The plurality of flow deflectors define a second profile body extending between a second leading edge and a second trailing edge with a second chord extending between the second leading edge and the second trailing edge. The second profile body defines an outer surface extending vertically from a base portion of the plurality of flow deflectors such that the base portion is configured to be disposed on the respective pressure surface or suction surface along which the plurality of flow deflectors extend therefrom.

26 Claims, 13 Drawing Sheets

Related U.S. Application Data

(60) Provisional application No. 61/909,733, filed on Nov. 27, 2013, provisional application No. 62/191,706, filed on Jul. 13, 2015.

(52) U.S. Cl.
CPC ....... *F05B 2210/16* (2013.01); *F05B 2220/32* (2013.01); *F05B 2240/221* (2013.01); *F05B 2240/30* (2013.01); *F05D 2220/30* (2013.01); *F05D 2240/305* (2013.01); *Y02E 10/28* (2013.01); *Y02E 10/721* (2013.01); *Y02T 50/673* (2013.01)

(58) Field of Classification Search
CPC ............... B64C 27/467; F05B 2240/30; F05B 2240/301; Y02E 10/28; Y02E 10/721; Y02T 50/673
See application file for complete search history.

(56) References Cited

U.S. PATENT DOCUMENTS

| | | | |
|---|---|---|---|
| 7,585,157 B2 * | 9/2009 | Quell | F03D 1/0633 416/236 R |
| 7,857,597 B2 * | 12/2010 | Anjuri | F03D 1/06 416/228 |
| 8,047,784 B2 * | 11/2011 | Bonnet | F03D 1/0675 416/1 |
| 2009/0068018 A1 * | 3/2009 | Corten | F03D 1/0641 416/223 R |
| 2011/0142664 A1 | 6/2011 | Anjuri et al. | |
| 2011/0223033 A1 | 9/2011 | Wang et al. | |
| 2012/0061522 A1 | 3/2012 | Sullivan et al. | |
| 2012/0189444 A1 * | 7/2012 | Haag | F03D 1/0633 416/9 |
| 2012/0269644 A1 | 10/2012 | Enevoldsen et al. | |
| 2013/0129520 A1 | 5/2013 | Enevoldsen et al. | |
| 2013/0224037 A1 | 8/2013 | Simpson et al. | |
| 2014/0334938 A1 * | 11/2014 | Riddell | F03D 1/0633 416/236 R |
| 2015/0010407 A1 * | 1/2015 | Zamora Rodriguez | F03D 1/0641 416/236 R |
| 2015/0064003 A1 * | 3/2015 | Drobietz | F03D 1/0641 416/1 |
| 2015/0176564 A1 * | 6/2015 | Kumar | F03D 1/0675 416/236 R |

* cited by examiner

BLADE FLOW DEFLECTOR

CROSS-REFERENCE TO RELATED APPLICATIONS

This application is a Continuation-In-Part of U.S. Non-Provisional application Ser. No. 15/039,993, filed May 27, 2016, which is a U.S. National Phase of International Application No. PCT/US2014/067643, filed Nov. 26, 2014, which claims the benefit of U.S. Provisional Application No. 61/909,733, filed Nov. 27, 2013. This application also claims the benefit of U.S. Provisional Application No. 62/191,706, filed Jul. 13, 2015. The applications are herein incorporated by reference in their entireties.

TECHNICAL FIELD

The present disclosure relates to blades, and more specifically, to blades having incorporated flow deflectors for use in various applications, for example, wind turbines, helicopters, hydro turbines, airplane wings, engines, propellers, and industrial turbines.

BACKGROUND

Wind turbines produce power proportional to the swept area of their blades, and the amount of air flow passing over the blades at any given time. Various design choices such as rotor diameter, blade length and load limitations are considered during design and fabrication of a wind turbine. Longer blades provide for more energy production in low winds. However, longer blades require more materials, higher manufacture and transportation costs, larger and more robust rotor design to support the added weight of the longer blades, and failsafe systems for preventing potential damage to the turbines in high wind situations as the longer blades may produce damaging levels of torque at high wind speeds.

Conversely, using shorter blades has its own set of drawbacks. For example, in low winds shorter blades may not have enough surface area to produce enough torque to move the rotor, thereby producing no power.

Regardless of size, all wind turbine blades are limited in overall efficiency due to various resulting properties of the air flow. Due to the rotational movement of the blades during operation, at least a portion of the air flow impacting the blade is converted to a radial component moving about the length of the blade from the root toward the tip of the blade. FIG. 1 illustrates a standard wind turbine 10 with a mast 12 supporting a hub 14 from which a plurality of blades 16 are supported. The mass of air affected by the turbine forms a stream tube as the wind must slow down due to energy extracted by the turbine. Wind W directed at the turbines will have an initial area as indicated by the circle 18. As the wind W reaches the blades 16, the air flow has two components, namely an axial flow $W_A$ and a radial flow $W_R$, with the area of the wind flow expanding radially as indicated by circle 20 due to the conservation of mass flow rate along the stream tube. The flow continues to expand radially downstream, as indicated by the increased area at circle 22, since the pressure in the wake must return to the atmospheric pressure after a pressure drop experienced by passing though the rotor disc. Based on the conservation of momentum, this radial flow $W_R$ reduces the efficiency of the turbine since it creates a radial force from the available total force from the wind. This radial force is not contributing to any torque or power produced by the rotor.

The present disclosure addresses these and other similar problems resulting from conventional blade design. It allows the blade to convert part of that radial force into a tangential force by redirecting the radial flow $W_R$, thereby increasing the torque and power extracted by the turbine.

SUMMARY

In a first aspect, there is provided herein a blade assembly including a blade extending in a radial direction from a root towards a tip. The blade includes a lift generating section with a first profile body defined between a pressure surface and a suction surface. The first profile body extends from a first leading edge to a first trailing edge with a first chord extending from the first leading edge to the first trailing edge and being perpendicular to the radial direction. A plurality of flow deflectors extend along either the pressure surface or the suction surface within the lift generating section of the blade. The plurality of flow deflectors define a second profile body extending between a second leading edge and a second trailing edge with a second chord extending between the second leading edge and the second trailing edge. The second profile body defines an outer surface extending vertically from a base portion of the plurality of flow deflectors such that the base portion is configured to be disposed on the respective pressure surface or suction surface along which the plurality of flow deflectors extend therefrom. The plurality of flow deflectors are positioned along a length of the blade so that a radial component of velocity of an incoming airflow is redirected to produce an additional amount of torque on a rotor, thereby increasing overall power produced by a turbine incorporating the blade assembly.

In certain embodiments, the second chord is at an angle a of between −10° and 40° relative to the first chord.

In certain embodiments, the plurality of flow deflectors are separated from one another by a distance that is equal to a length of the first chord.

In certain embodiments, the plurality of flow deflectors are separated from one another by a distance that is equal to approximately ⅛ to 4 times a length of the first chord.

In certain embodiments, the plurality of flow deflectors extend along the pressure surface within the lift generating section of the blade and the plurality of flow deflectors extend along the suction surface within the lift generating section of the blade.

In certain embodiments, the plurality of flow deflectors are positioned along the blade between the first leading edge and the first trailing edge.

In certain embodiments, the first profile body has a first height and the second profile body has a second height and wherein the second height is between 1/10 to 2 that of the first height.

In certain embodiments, the second profile body has a height that is equal to approximately 1/50 to ⅖ that of a length of the first chord.

In certain embodiments, the second profile body has a width that is equal to approximately 1/100 to 1/10 that of a length of the second chord.

In certain embodiments, the second profile body has a width that is equal to approximately 1/1000 to 1/10 that of a length of the first chord.

In certain embodiments, the second profile body has a length that is equal to approximately 1/10 to 1 that of a length of the first chord.

In certain embodiments, the plurality of flow deflectors are formed integrally with the first profile body.

In certain embodiments, the plurality of flow deflectors are formed separately from the first profile body and are attached thereto.

In certain embodiments, the plurality of flow deflectors are attached to the first profile body using at least one of aerospace double-sided tape, glue and epoxy.

In certain embodiments, the plurality of flow deflectors are attached to the first profile body using flat head rivets.

In certain embodiments, the second profile body is configured as a flat plate or airfoil profile.

In certain embodiments, the base portion is configured to be suitably shaped so as to conform to at least one of the pressure surface and suction surface for precise attachment thereto within the lift generating section of the blade.

In certain embodiments, the second leading edge is tapered or non-tapered.

In certain embodiments, a corner of the second trailing edge is rounded or straight.

In certain embodiments, the second profile body is configured to be inclined towards the root of the blade.

In certain embodiments, the blade has an in-plane curved configuration.

In certain embodiments, the plurality of flow deflectors are positioned proximate the leading edge, the trailing edge or anywhere in between the first profile body.

In a second aspect, there is disclosed herein a wind turbine assembly including a hub configured to rotate in a direction of rotation and a plurality of blade assemblies as described above attached to the hub assembly. The plurality of flow deflectors are configured so as to alter the incident airflow so that an additional force is produced in the direction of rotation and an additional power is generated.

In a third aspect, there is disclosed herein a hydro blade assembly including a blade extending in a radial direction from a root towards a tip. The blade includes a lift generating section with a first profile body defined between a pressure surface and a suction surface. The first profile body extends from a first leading edge to a first trailing edge with a first chord extending from the first leading edge to the first trailing edge and being perpendicular to the radial direction. A plurality of flow deflectors extend along either the pressure surface or the suction surface within the lift generating section of the blade. The plurality of flow deflectors define a second profile body extending between a second leading edge and a second trailing edge with a second chord extending between the second leading edge and the second trailing edge. The second profile body defines an outer surface extending vertically from a base portion of the plurality of flow deflectors such that the base portion is configured to be disposed on the respective pressure surface or suction surface along which the plurality of flow deflectors extend therefrom. The plurality of flow deflectors are positioned along a length of the blade so that a radial component of velocity of an incoming water flow is redirected to produce an additional amount of torque on a rotor, thereby increasing overall power produced by a turbine incorporating the hydro blade assembly.

In certain embodiments, the second profile body is configured as a flat plate or hydro foil profile.

In a fourth aspect, there is disclosed herein a hydro turbine assembly including a hub configured to rotate in a direction of rotation and a plurality of hydro blade assemblies as described above attached to the hub assembly. The plurality of flow deflectors are configured so as to alter the incident water flow so that an additional force is produced in the direction of rotation and an additional power is generated.

Various advantages of this disclosure will become apparent to those skilled in the art from the following detailed description, when read in light of the accompanying drawings.

BRIEF DESCRIPTION OF THE DRAWINGS

Embodiments will be described with reference to the following drawing figures, in which like numerals represent like items through the figures, and in which.

DETAILED DESCRIPTION

Figure 1:
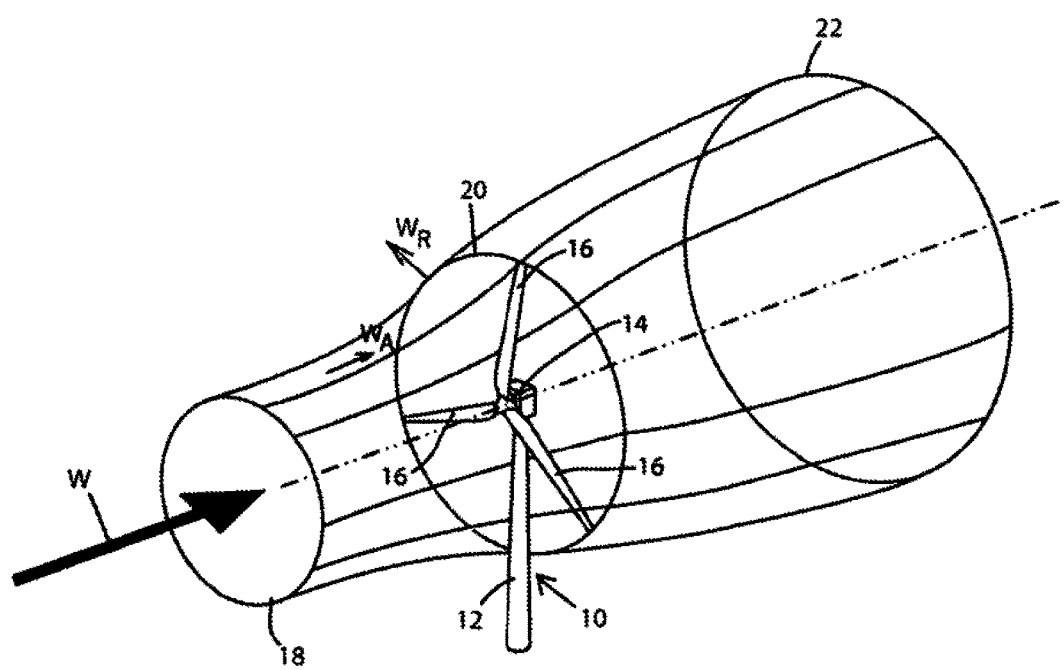
FIG. 1 is a perspective view of an example prior art wind turbine and the corresponding typical air flow thereabout.
Figure 2:
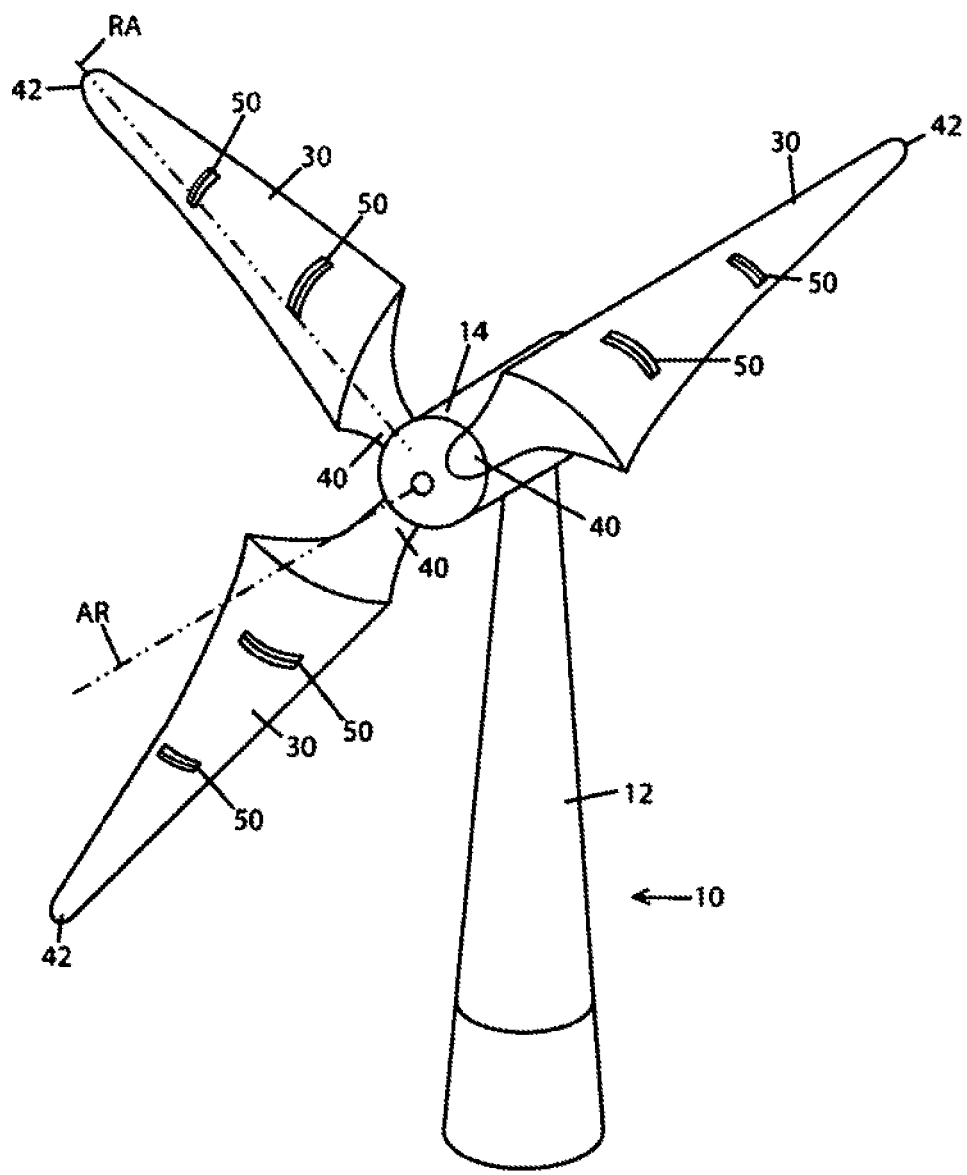
FIG. 2 is a perspective view of an example of a wind turbine having blades incorporating flow deflectors in accordance with an embodiment of the present disclosure.
Figure 3:
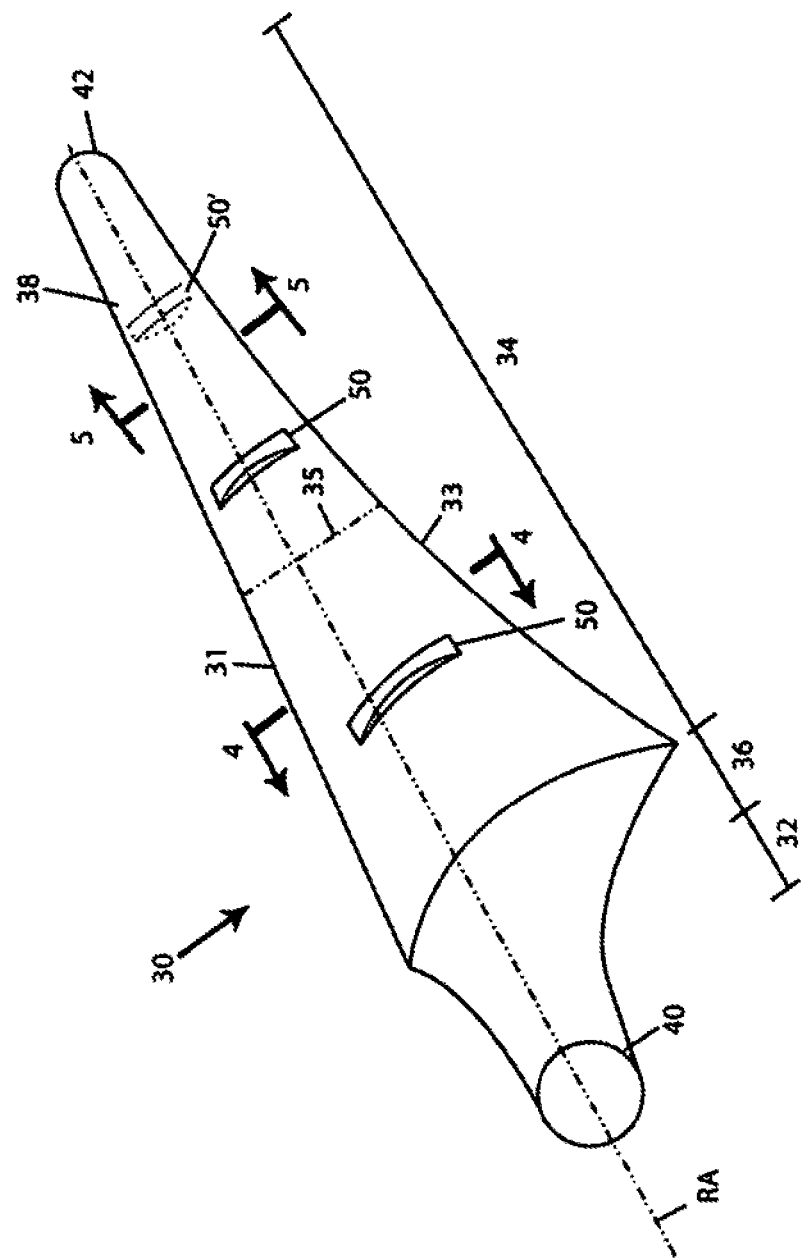
FIG. 3 is a perspective view of an example blade incorporating flow deflectors in accordance with an embodiment of the present disclosure.
Figure 4:
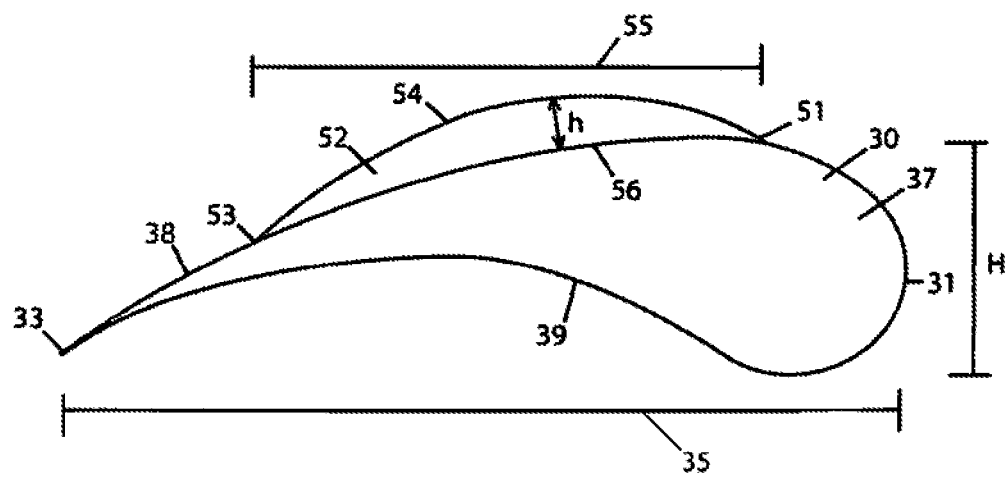
FIG. 4 is a cross-sectional view along the line 4-4 in FIG. 3.
Figure 5:
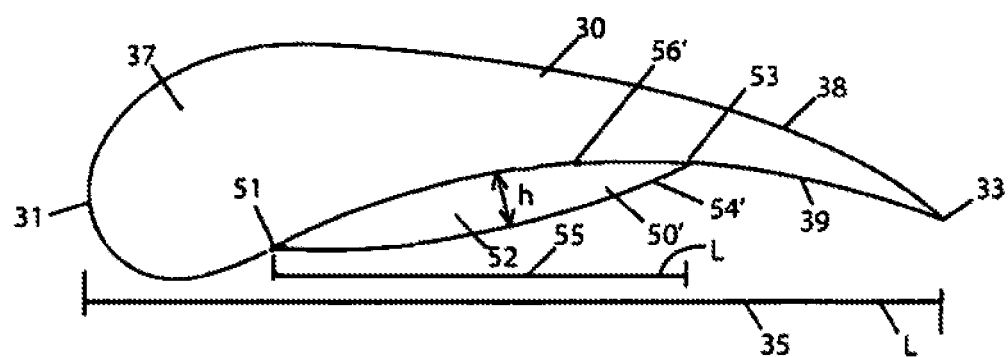
FIG. 5 is a cross-sectional view along the line 5-5 in FIG. 3

This disclosure is not limited to the particular systems, devices and methods described, as these can vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The present disclosure relates to deflectors positioned on either the pressure surface or suction surface of a blade. The blades will be described herein in conjunction with a wind turbine, however, the disclosure is not limited to such and the deflectors may be positioned on blades used in various applications, for example, helicopters, hydro turbines, airplane wings, engines, propellers, and industrial turbines.

Referring to FIGS. 2-6, blades 30 incorporating flow deflectors 50 in accordance with an embodiment of the disclosure will be described. The blades 30 are illustrated positioned on the hub 14 of a wind turbine 10 with the hub 14 supported by a mast 12. The hub 14 and blades 30 rotate about an axis of rotation AR. Each blade 30 extends radially along a radial axis RA from a root 40 to a tip 42. Each blade 30 generally includes three sections, namely a root section 32, a transition section 36 and a lift generating section 34. The root section 32 connects the blade 30 to the hub 14. The lift generating segment 34 is furthest from the hub 14 and includes a profiled body 37 extending between a pressure surface 39 and a suction surface 38. The profiled body 37 extends between a leading edge 31 and a trailing edge 33. A chord 35 is defined from the leading edge 31 to the trailing edge 33 and is perpendicular to the radial axis RA. The chord 35 has a length L and the profile body 37 has a height H.

One or more flow deflectors 50, 50' are provided along the pressure surface 39, the suction surface 38 or both surfaces within the lift generating section 34. The flow deflectors 50, 50' may be positioned proximate the leading edge 31, the trailing edge 33 or anywhere in between. In the illustrated embodiment, a pair of flow deflectors 50 are positioned along the suction surface 38 of each blade 30 and a single flow deflector 50' is positioned along the pressure surface 39 of each blade 30. The number and position of the deflectors 50, 50' are not limited to the illustrated embodiment and can be selected depending on the configuration of the blade 30 and the operating environment. The deflectors 50, 50' may be formed integral with blade 30 or may be formed separately and attached thereto. For example, the deflectors 50, 50' may be attached to the blade 30 utilizing aerospace double-sided tape with a thickness on the order of micrometers or utilizing small flat head rivets to minimize drag. Various other attachment mechanisms may be utilized. Additionally, the deflectors 50, 50' may be provided along the surfaces during original manufacture of the blades 30 or may be attached to existing blades 30 in a retro-fit fashion. Furthermore, the deflectors 50, 50' may be adjustably positioned such that the position and orientation may be adjusted to correspond to current operating condition (e.g. more or less wind).

Each flow deflector 50, 50' has a profile body 52 extending from a leading edge 51 to a trailing edge 53. A chord 55 is defined from the leading edge 51 to the trailing edge 53 and is perpendicular to the radial axis RA or at angle a thereto as described hereinafter. The chord 55 has a length l and the profile body 52 has a height h and a width w. Each profile body 52 has an outer surface 54 and a contact surface 56, 56' and defines a streamline body, such as a flat plate or a thin airfoil. The deflectors 50, 50' generally extend such that they extend beyond the boundary layer flow over the blade 30.

The flow deflectors 50, 50' may be sized proportional to the blade 30. For example, the flow deflectors may have a chord length l which is between 1/10 to 1 that of the blade chord length L, and more preferably between 1/6 to 1/2 of the length L. Also, the flow deflectors may have a height h which is between 1/10 to 2 that of the blade height H, and more preferably between 1/8 to 1/2 of the height H. Also, the width w of the flow deflections may also be proportional to the chord length L of the blade 30, with a width w between about 0.1-10% of the blade chord length L. It is understood that if more than one deflector 50, 50' is positioned on the blade 30, the deflectors 50, 50' may have different configurations. For example, the suction surface deflectors 50 may be sized differently than the pressure side deflectors 50', however, it is also possible that there may be differences in configuration between multiple suction surface deflectors 50 or multiple suction pressure deflectors 50'.

Figure 6:
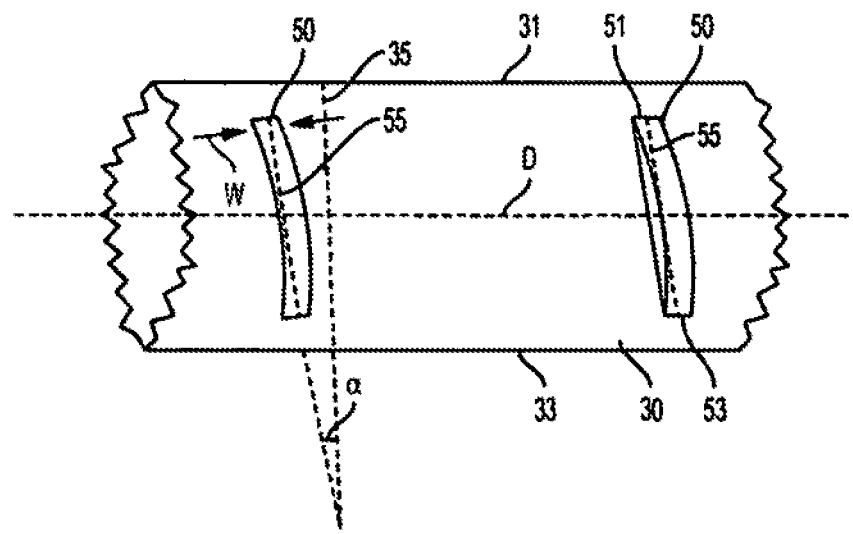
FIG. 6 is a top plan view of a portion of the blade of FIG. 3.

Referring to FIG. 6, each of the deflectors 50, 50' may be positioned at an angle α relative to the blade 30. More specifically, the chord 55 of each deflector may be at an angle α relative to the chord 35 of the blade 30. The angle a may be between about −10° and 40° and more preferably between about 0° and 15°. If multiple deflectors 50, 50' are positioned along either surface 38, 39, they may be at different angles a. The deflectors 50, 50' are spaced from one another in the direction of the radial axis RA by a distance D. The distance D may vary between deflectors 50, 50' on a given surface and between surfaces. As one example, the distance D may be equal to the chord length L.

Figure 7:
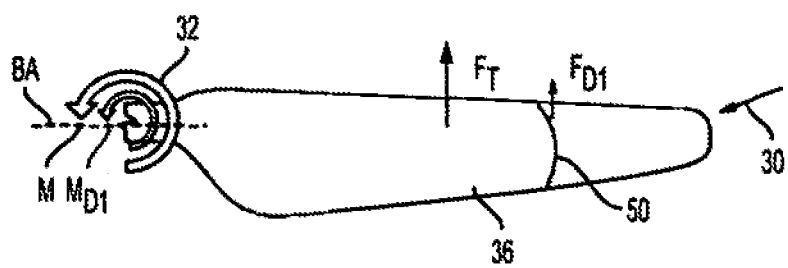
FIG. 7 is a top plan view of a blade incorporating a flow deflector in accordance with an embodiment of the disclosure and illustrating the resultant forces thereon.
Figure 8:
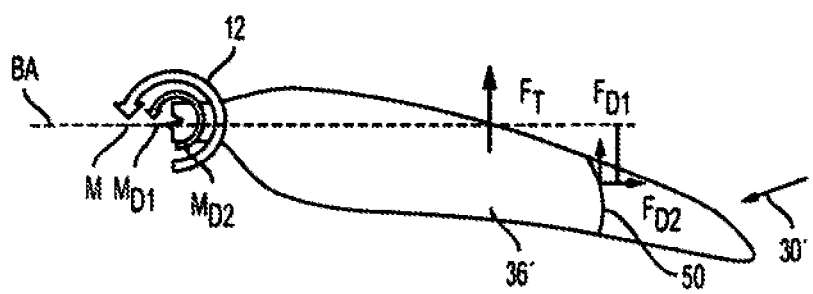
FIG. 8 is a top plan view of another blade incorporating a flow deflector in accordance with an embodiment of the disclosure and illustrating the resultant forces thereon.
Figure 9:
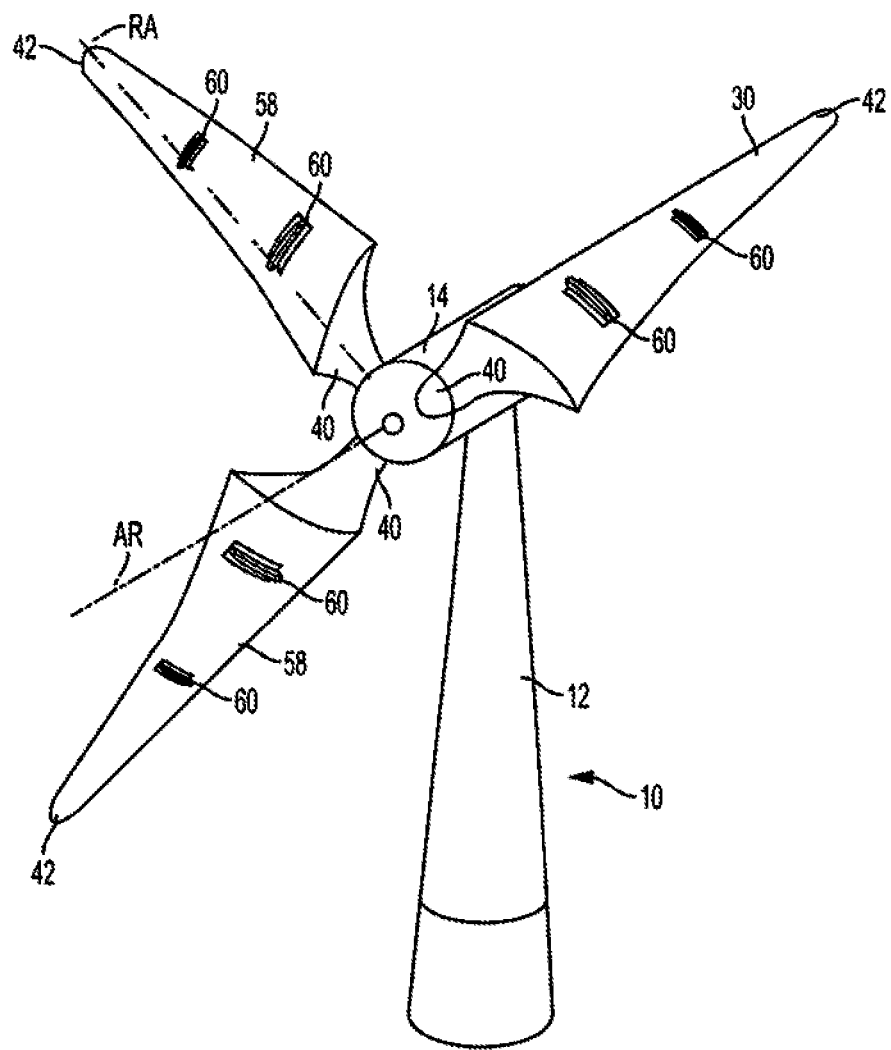
FIG. 9 is a perspective view of an example of a wind turbine having blades incorporating flow deflectors in accordance with an embodiment of the present disclosure.
Figure 10:
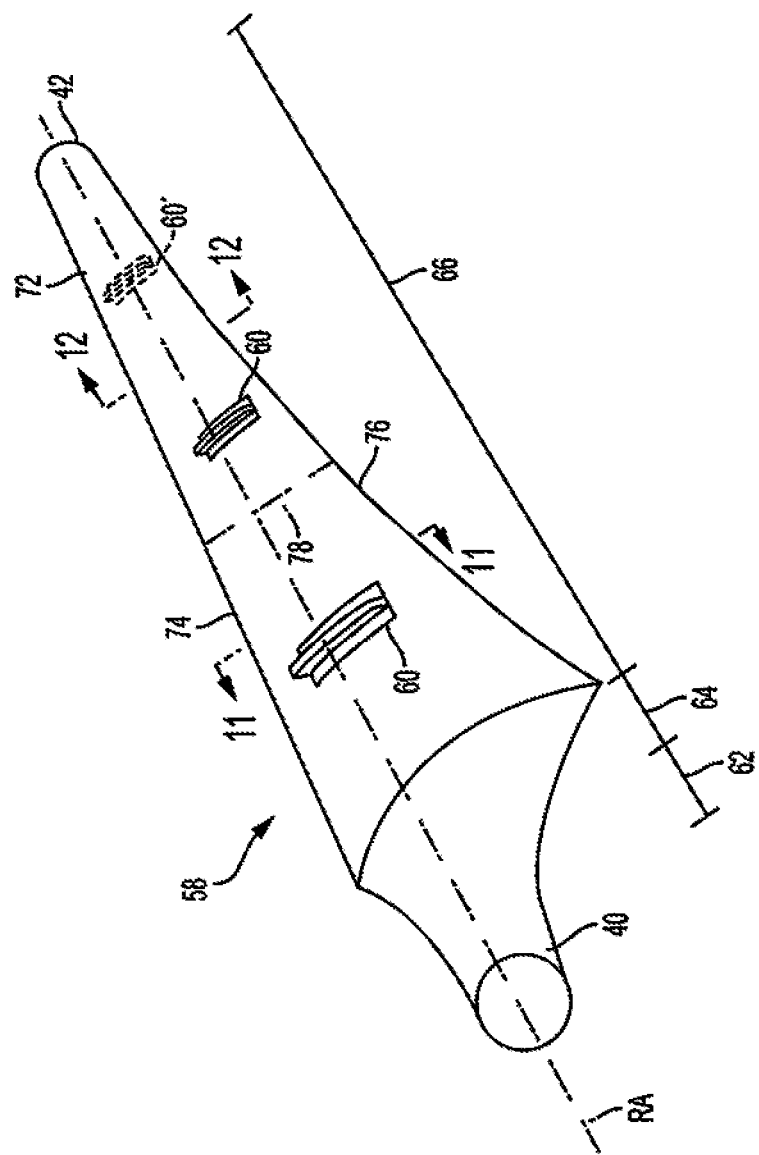
FIG. 10 is a perspective view of an example blade incorporating flow deflectors in accordance with an embodiment of the present disclosure.
Figure 11:
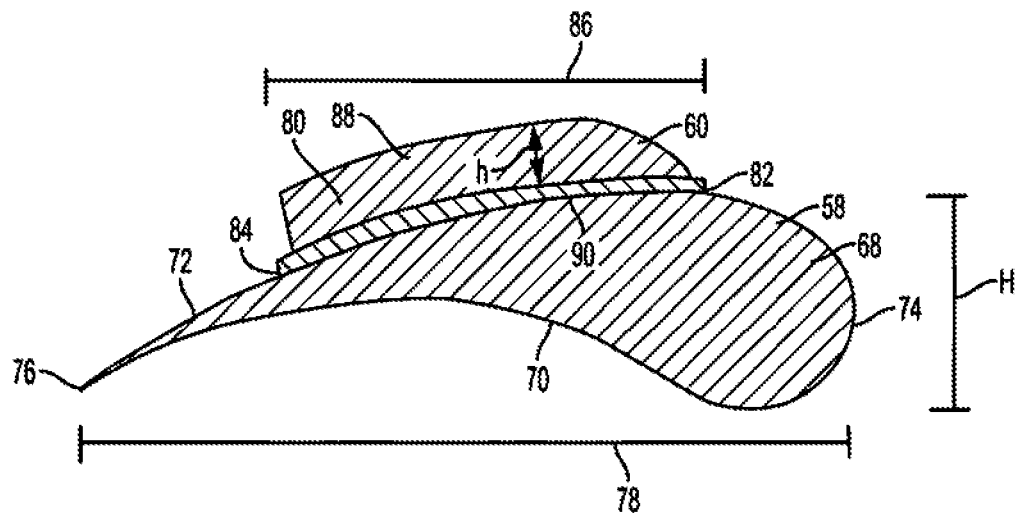
FIG. 11 is a cross-sectional view along the line 11-11 in FIG. 10.
Figure 12:
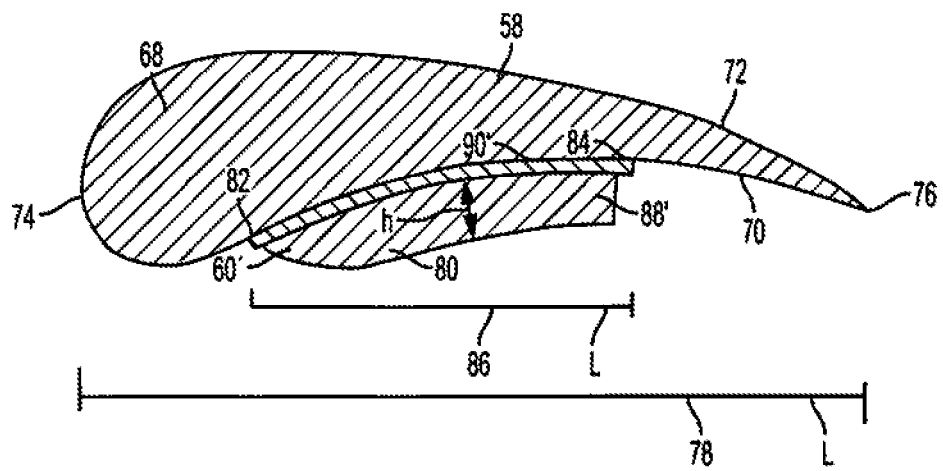
FIG. 12 is a cross-sectional view along the line 12-12 in FIG. 10.

Referring to FIGS. 7 and 8, an illustration of resultant increased efficiency from the flow deflectors 50, 50' will be described. FIG. 7 shows the moment, $M+M_{D1}$, and force, $F_T+F_{D1}$, generated by a blade 30 with a deflector 50. The additional force contribution by the deflector to the turbine blade is $F_{D1}$. This force generates an additional moment $M_{D1}$ which contributes to the total power generated by the turbine. FIG. 8 shows an in-plane curved wind turbine blade 30' with a flow deflector 50. The configuration of the lift generating section 36' is distinct from that of the blade 30 in FIG. 7. This configuration of blade with the flow deflector 50 generates an additional torque $M_{D2}$, that contributes to the power generated and it is due to the normal force $F_{D2}$ created by the deflector 50.

Integrating the deflectors 50, 50' onto existing turbines, or incorporating their design into new turbines will increase the overall efficiency of the turbines. The deflectors may act as passive flow controllers, not requiring any additional control or monitoring equipment. By introducing the flow deflectors at several positions along the blade's length, the radial component of velocity of the incoming air flow may be redirected to produce an additional amount of torque on the rotor, thereby increasing the overall power produced by the turbine.

Referring now to FIGS. 9-15, blades 58 incorporating flow deflectors 60 in accordance with another embodiment of the disclosure will be described. The blades 58 are illustrated positioned on the hub 14 of a wind turbine 10 with the hub 14 supported by a mast 12. The hub 14 and blades 58 rotate about an axis of rotation AR. Each blade 58 extends radially along a radial axis RA from a root 40 to a tip 42. Each blade 58 generally includes three sections, namely a root section 62, a transition section 64 and a lift generating section 66. The root section 62 connects the blade 58 to the hub 14. The lift generating segment 66 is furthest from the hub 14 and includes a profile body 68 extending between a pressure surface 70 and a suction surface 72. The profile body 68 extends between a leading edge 74 and a trailing edge 76. A chord 78 is defined from the leading edge 74 to the trailing edge 76 and is perpendicular to the radial axis RA. The chord 78 has a length L and the profile body 68 has a height H.

One or more flow deflectors 60, 60' are provided along the pressure surface 70, the suction surface 72 or both surfaces within the lift generating section 66. The flow deflectors 60, 60' may be positioned proximate the leading edge 74, the trailing edge 76 or anywhere in between. In the illustrated embodiment, a pair of flow deflectors 60 is positioned along the suction surface 72 of each blade 58 and a single flow deflector 60' is positioned along the pressure surface 70 of each blade 58. The number and position of the deflectors 60, 60' are not limited to the illustrated embodiment and can be selected depending on the configuration of the blade 58 and the operating environment. The deflectors 60, 60' may be formed integrally with blade 58 or may be formed separately and attached thereto. For example, the deflectors 60, 60' may be attached to the blade 58 utilizing aerospace double-sided tape with a thickness on the order of micrometers or utilizing small flat head rivets to minimize drag. Various other attachment mechanisms may be utilized such as via glue and epoxy. Additionally, the deflectors 60, 60' may be provided along the surfaces during original manufacture of the blades 58 or may be attached to existing blades 58 in a retro-fit fashion. Furthermore, the deflectors 60, 60' may be adjustably positioned such that the position and orientation may be adjusted to correspond to current operating condition (e.g. more or less wind).

Figure 15:
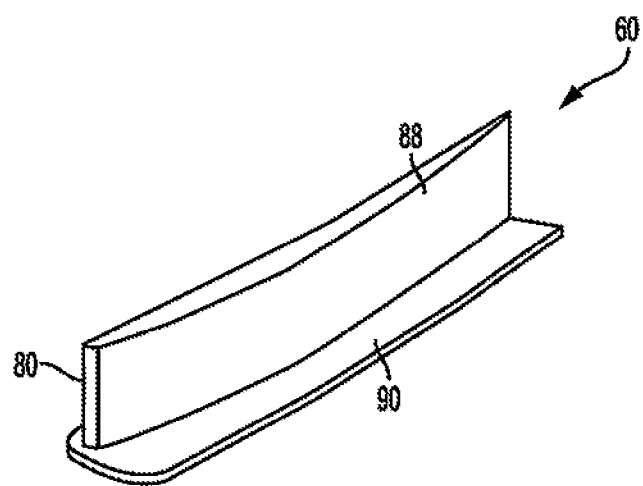
FIG. 15 is an up close isometric view of a flow deflector with an airfoil profile in accordance with an embodiment of the disclosure.

Each flow deflector 60, 60' has a profile body 80 extending from a leading edge 82 to a trailing edge 84. A chord 86 is defined from the leading edge 82 to the trailing edge 84 and is perpendicular to the radial axis RA or at angle a thereto as described hereinafter. The chord 86 has a length l and the profile body 80 has a height h and a width w. Each profile body 80 has an outer surface 88 extending vertically from a base portion 90 and defines a streamline body, such as a flat plate (FIG. 14) or a thin airfoil profile (FIG. 15). The base portion 90 is configured to be disposed on the respective pressure surface 70 or suction surface 72 along which the flow deflectors 60, 60' extend therefrom. The base portion 90, 90' is configured to be suitably shaped so as to conform to the pressure surface 70 or suction surface 72 for precise attachment thereto within the lift generating section 66 of the blade 58. The flow deflectors 60, 60' generally extend such that they extend beyond the boundary layer flow over the blade 58. The profile body 80 may be configured to incline towards the root section 32 of the blade 58.

In some embodiments, the leading edge 82 of the profile body 80 can be tapered or non-tapered. In other embodiments, the trailing edge 84 of the profile body 80 has a corner that can be rounded or straight.

The flow deflectors 60, 60' may be sized proportional to the blade 58. For example, the flow deflectors may have a chord length l which is between 1/10 to 1 that of the blade chord length L, and more preferably between 1/6 to 1/2 of the length L. Also, the flow deflectors may have a height h which is between 1/10 to 2 that of the blade height H, and more preferably between 1/8 to 1/2 of the height H. In addition, the flow deflectors 60, 60' may have a height h that is equal to approximately 1/50 to 2/5 that of the blade chord length L, and more preferably between 1/25 to 1/5 that of the length L. Also, the width w of the flow deflectors 60, 60' may also be proportional to the chord length L of the blade 58, with a width w that is equal to approximately 1/1000 to 1/10 that of the blade chord length L. The width w of the flow deflectors 60, 60' may also be proportional to the chord length l of the flow deflectors with a width w that is equal to approximately 1/100 to 1/10 that of the chord length l of the flow deflectors.

It is understood that if more than one deflector 60, 60' is positioned on the blade 58, the deflectors 60, 60' may have different configurations. For example, the suction surface deflectors may be sized differently than the pressure surface deflectors, however, it is also possible that there may be differences in configuration between multiple suction surface deflectors or multiple pressure surface deflectors. It is further understood that the deflectors 60, 60' can extend along the pressure surface 70 and the suction surface 72 within the lift generating section 66 of the blade 58.

Figure 13:
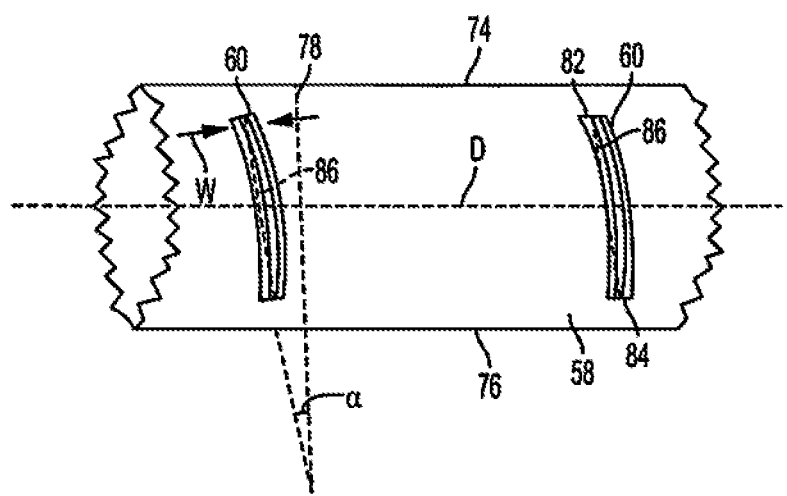
FIG. 13 is a top plan view of a portion of the blade of FIG. 10.
Figure 14:
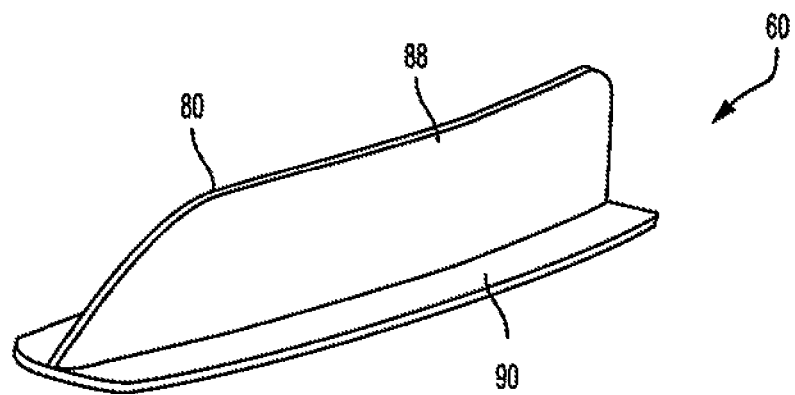
FIG. 14 is an up close isometric view of a flow deflector shaped as a flat plate in accordance with an embodiment of the disclosure.

Referring to FIG. 13, each of the deflectors 60, 60' may be positioned at an angle a relative to the blade 58. More specifically, the chord 86 of each deflector 60, 60' may be at an angle a relative to the chord 78 of the blade 58. The angle α may be between about −10° and 40° and more preferably between about 0° and 15°. If multiple deflectors 60, 60' are positioned along either surface 70, 72, they may be at different angles a. The deflectors 60, 60' are spaced from one another in the direction of the radial axis RA by a distance D. The distance D may vary between deflectors 60, 60' on a given surface and between surfaces. As one example, the distance D may be equal to the chord length L. In another example, the distance D is equal to approximately 1/8 to 4 that of the chord length L.

Figure 16:
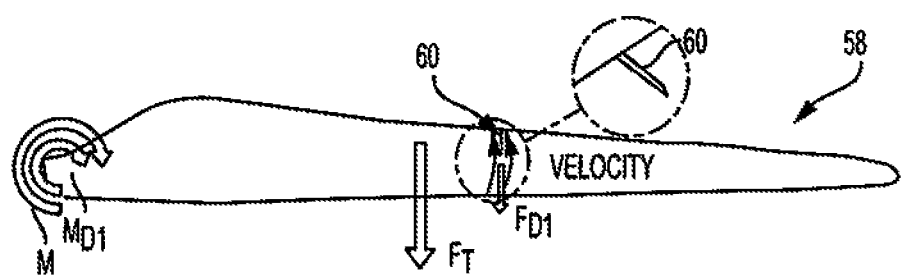
FIG. 16 is a top plan view of a blade incorporating a flow deflector in accordance with an embodiment of the disclosure and illustrating the resultant forces thereon.
Figure 17:
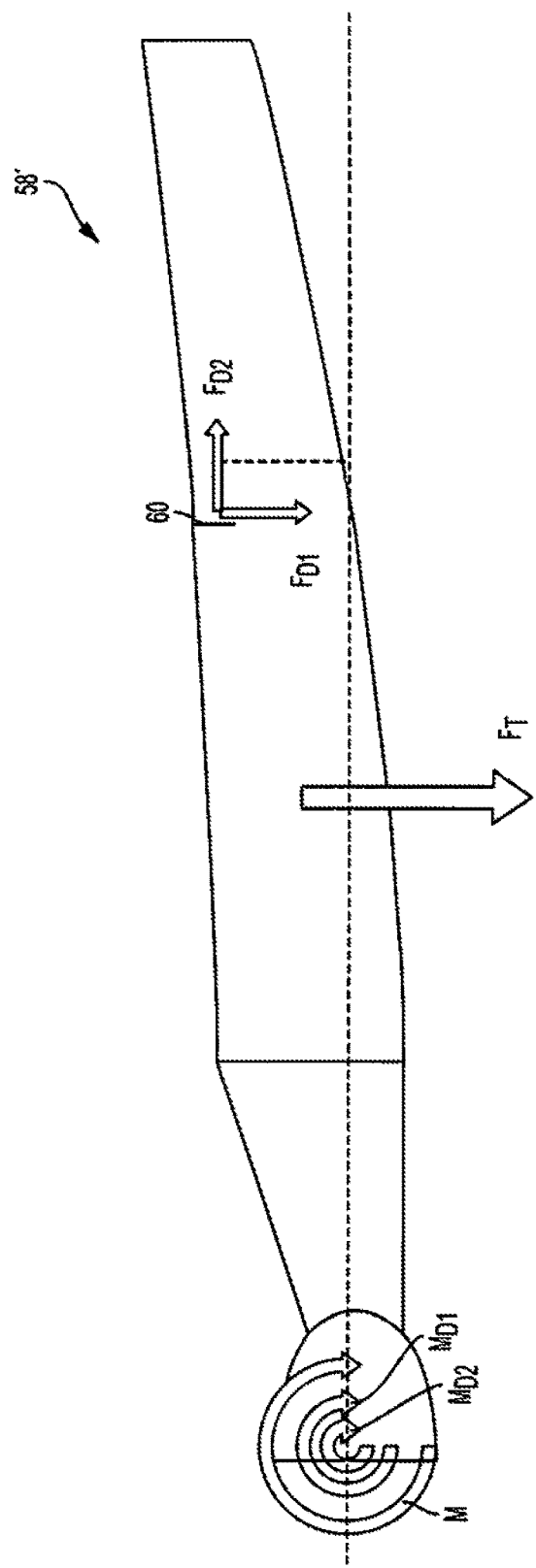
FIG. 17 is a top plan view of another blade incorporating a flow deflector in accordance with an embodiment of the disclosure and illustrating the resultant forces thereon.

Referring to FIGS. 16 and 17, an illustration of resultant increased efficiency from the flow deflectors 60, 60' will be described. FIG. 16 shows the moment, $M+M_{D1}$, and force, $F_T+F_{D1}$, generated by a blade 58 with a deflector 60. The additional force contribution by the deflector to the turbine blade is $F_{D1}$. This force generates an additional moment $M_{D1}$ which contributes to the total power generated by the turbine. FIG. 17 shows an in-plane curved wind turbine blade 58' with a flow deflector 60. The configuration of the lift generating section 66' is distinct from that of the blade 58 in FIG. 16. This configuration of blade with the flow deflector 60 generates an additional torque $M_{D2}$, that contributes to the power generated and it is due to the normal force $F_{D2}$ created by the deflector 60.

The integration of deflectors 60, 60' onto existing turbines, or incorporating their design into new turbines will increase the overall efficiency of the turbines. The deflectors may act as passive flow controllers, not requiring any additional control or monitoring equipment. By introducing the flow deflectors at several positions along the blade's length, the radial component of velocity of the incoming air flow may be redirected to produce an additional amount of torque on the rotor, thereby increasing the overall power produced by the turbine.

As previously mentioned, in accordance with the present disclosure, the blades described herein for use in conjunction with a wind turbine may also be positioned on blades for use in conjunction with a hydro turbine (not shown). A hydro blade assembly hence has the same structure as the blade assembly described in conjunction with a wind turbine. In a hydro blade assembly, the flow deflectors are positioned along a length of the blade so that a radial component of velocity of an incoming water flow is redirected to produce an additional amount of torque on a rotor, thereby increasing overall power produced by a turbine incorporating the hydro blade assembly. The flow deflectors used in conjunction with a hydro turbine are configured to alter the incident water flow so that an additional force is produced in the direction of rotation and an additional power is generated.

These and other advantages of the present invention will be apparent to those skilled in the art from the foregoing specification. Accordingly, it will be recognized by those skilled in the art that changes or modifications may be made

What we claimed is:

1. A blade assembly comprising:
   a blade extending in a radial direction from a root towards a tip, the blade including a lift generating section with a first profile body defined between a pressure surface and a suction surface, the first profile body extending from a first leading edge to a first trailing edge with a first chord extending form the first leading edge to the first trailing edge and being perpendicular to the radial direction;
   a plurality of flow deflectors extending along either the pressure surface or the suction surface within the lift generating section of the blade, the plurality of flow deflectors defining a second profile body extending between a second leading edge and a second trailing edge with a second chord extending between the second leading edge and the second trailing edge, the second profile body defining an outer surface extending vertically from a base portion of the plurality of flow deflectors such that the base portion is configured to be disposed on the respective pressure surface or suction surface along which the plurality of flow deflectors extend therefrom;
   wherein the plurality of flow deflectors are positioned along a length of the blade so that a radial component of velocity of an incoming airflow is redirected to produce an additional amount of torque on a rotor, thereby increasing overall power produced by a turbine incorporating the blade assembly.

2. The blade assembly according to claim 1 wherein the second chord is at an angle α of between −10° and 40° relative to the first chord.

3. The blade assembly according to claim 1 wherein the plurality of flow deflectors are separated from one another by a distance that is equal to a length of the first chord.

4. The blade assembly according to claim 1 wherein the plurality of flow deflectors are separated from one another by a distance that is equal to approximately 1/8 to 4 times a length of the first chord.

5. The blade assembly according to claim 1 wherein the plurality of flow deflectors extend along the pressure surface within the lift generating section of the blade and the plurality of flow deflectors extend along the suction surface within the lift generating section of the blade.

6. The blade assembly according to claim 1 wherein the plurality of flow deflectors are positioned along the blade between the first leading edge and the first trailing edge.

7. The blade assembly according to claim 1 wherein the first profile body has a first height and the second profile body has a second height and wherein the second height is between 1/10 to 2 that of the first height.

8. The blade assembly according to claim 1 wherein the second profile body has a height that is equal to approximately 1/50 to 2/5 that of a length of the first chord.

9. The blade assembly according to claim 1 wherein the second profile body has a width that is equal to approximately 1/100 to 1/10 that of a length of the second chord.

10. The blade assembly according to claim 1 wherein the second profile body has a width that is equal to approximately 1/1000 to 1/10 that of a length of the first chord.

11. The blade assembly according to claim 1 wherein the second profile body has a length that is equal to approximately 1/10 to 1 that of a length of the first chord.

12. The blade assembly according to claim 1 wherein the plurality of flow deflectors are formed integrally with the first profile body.

13. The blade assembly according to claim 1 wherein the plurality of flow deflectors are formed separately from the first profile body and are attached thereto.

14. The blade assembly according to claim 1 wherein the plurality of flow deflectors are attached to the first profile body using at least one of aerospace double-sided tape, glue and epoxy.

15. The blade assembly according to claim 1 wherein the plurality of flow deflectors are attached to the first profile body using flat head rivets.

16. The blade assembly according to claim 1 wherein the second profile body is configured as a flat plate or airfoil profile.

17. The blade assembly according to claim 1 wherein the base portion is configured to be suitably shaped so as to conform to at least one of the pressure surface and suction surface for precise attachment thereto within the lift generating section of the blade.

18. The blade assembly according to claim 1 wherein the second leading edge is tapered or non-tapered.

19. The blade assembly according to claim 1 wherein a corner of the second trailing edge is rounded or straight.

20. The blade assembly according to claim 1 wherein the second profile body is configured to be inclined towards the root of the blade.

21. The blade assembly according to claim 1 wherein the plurality of flow deflectors are positioned proximate the leading edge, the trailing edge or anywhere in between the first profile body.

22. The blade assembly according to claim 1 wherein the blade has an in-plane curved configuration.

23. A wind turbine assembly comprising:
   a hub configured to rotate in a direction of rotation;
   a plurality of blade assemblies according to claim 1 attached to the hub assembly;
   wherein the plurality of flow deflectors are configured so as to alter the incident airflow so that an additional force is produced in the direction of rotation and an additional power is generated.

24. A hydro blade assembly comprising:
   a blade extending in a radial direction from a root towards a tip, the blade including a lift generating section with a first profile body defined between a pressure surface and a suction surface, the first profile body extending from a first leading edge to a first trailing edge with a first chord extending form the first leading edge to the first trailing edge and being perpendicular to the radial direction;
   a plurality of flow deflectors extending along either the pressure surface or the suction surface within the lift generating section of the blade, the plurality of flow deflectors defining a second profile body extending between a second leading edge and a second trailing edge with a second chord extending between the second leading edge and the second trailing edge, the second profile body defining an outer surface extending vertically from a base portion of the plurality of flow deflectors such that the base portion is configured to be disposed on the respective pressure surface or suction surface along which the plurality of flow deflectors extend therefrom;

wherein the plurality of flow deflectors are positioned along a length of the blade so that a radial component of velocity of an incoming water flow is redirected to produce an additional amount of torque on a rotor, thereby increasing overall power produced by a turbine incorporating the hydro blade assembly.

25. The hydro blade assembly of claim 24 wherein the second profile body is configured as a flat plate or hydro foil profile.

26. A hydro turbine assembly comprising:
a hub configured to rotate in a direction of rotation;
a plurality of hydro blade assemblies according to claim 24 attached to the hub assembly;
wherein the plurality of flow deflectors are configured so as to alter the incident water flow so that an additional force is produced in the direction of rotation and an additional power is generated.

* * * * *